United States Patent
Stefani

(10) Patent No.: US 10,793,356 B2
(45) Date of Patent: Oct. 6, 2020

(54) DEVICE FOR SELECTIVELY PICKING AND DEPOSITING ARTICLES TO AN AUTOMATIC WAREHOUSE

(71) Applicant: MODULA S.P.A. CON SOCIO UNICO, Fiorano Modenese (Modena) (IT)

(72) Inventor: Franco Stefani, Sassuolo (IT)

(73) Assignee: MODULA S.P.A. CON SOCIO UNICO, Fiorano Modenese (IT)

( * ) Notice: Subject to any disclaimer, the term of this patent is extended or adjusted under 35 U.S.C. 154(b) by 151 days.

(21) Appl. No.: 16/084,482

(22) PCT Filed: Apr. 7, 2017

(86) PCT No.: PCT/IB2017/052012
§ 371 (c)(1),
(2) Date: Sep. 12, 2018

(87) PCT Pub. No.: WO2017/178940
PCT Pub. Date: Oct. 19, 2017

(65) Prior Publication Data
US 2019/0071251 A1    Mar. 7, 2019

(30) Foreign Application Priority Data

Apr. 13, 2016  (IT) ................. 102016000037986

(51) Int. Cl.
| G06F 7/00 | (2006.01) |
| B65G 1/137 | (2006.01) |
| B25J 9/00 | (2006.01) |
| B25J 9/02 | (2006.01) |
| B65G 47/90 | (2006.01) |
| B65G 1/127 | (2006.01) |

(52) U.S. Cl.
CPC .......... *B65G 1/1373* (2013.01); *B25J 9/0084* (2013.01); *B25J 9/0096* (2013.01); *B25J 9/026* (2013.01); *B65G 1/127* (2013.01); *B65G 1/137* (2013.01); *B65G 47/901* (2013.01); *B65G 47/905* (2013.01)

(58) Field of Classification Search
None
See application file for complete search history.

(56) References Cited

U.S. PATENT DOCUMENTS

| 2007/0140821 A1 | 6/2007 | Garon et al. | |
| 2015/0360885 A1* | 12/2015 | Arriaran Ugarte | .... B65G 47/91 414/799 |
| 2016/0137435 A1* | 5/2016 | Tanaka | ................. B25J 15/0014 414/564 |

FOREIGN PATENT DOCUMENTS

| EP | 2163498 | 3/2010 |
| EP | 2692668 | 2/2014 |

\* cited by examiner

Primary Examiner — Yolanda R Cumbess
(74) Attorney, Agent, or Firm — Pearne & Gordon LLP

(57) ABSTRACT

A device for selectively picking up and depositing articles to an automatic warehouse, comprising: a support plane (2), for the temporary support of an article (A); a temporary support (3), for the temporary support of a tray (V) intended to contain a predetermined number of articles (A); a manipulator (4,5), structured to grasp and release an article (A) and to translate the article (A) between the support plane (2) and the temporary support (3). The manipulator (4,5) comprises a first pickup element (4) and a second pickup element (5), movable independently of each other along a transverse direction (Y).

19 Claims, 10 Drawing Sheets

DEVICE FOR SELECTIVELY PICKING AND DEPOSITING ARTICLES TO AN AUTOMATIC WAREHOUSE

The present invention relates to a device for picking up and depositing articles to an automatic warehouse.

The invention relates in particular to an automatic warehouse inside which a plurality of trays or containers provided for supporting articles can be housed. Each of such trays or containers is housed in a pre-fixed space within the warehouse, for example, in a determined position of a shelf. A motor device operates between the shelves contained in the warehouse for transferring each tray between its waiting position, within the warehouse, and an access station, accessible by an operator, typically for picking up an article or for depositing an article.

In the warehouses currently available, there is a frequent need not to allow complete access to the tray positioned in the access station, but to allow limited access only to the article to be picked or only to the position of the tray in which the article is to be placed. For that purpose, the warehouses currently available are provided with barriers that are interposed between the access station and the operator, normally above the zone in which the trays are located.

Such barriers are structured to allow access to a limited zone of a tray below. Some types of barriers comprise a plurality of independent doors, each of which is movable between an open position and a closed position relative to a limited zone of the access station. Other types of barriers comprise two or more movable surfaces equipped with an end edge slidable on an access plane. The end edges of the various movable surfaces may define an opening whose size and whose position may be varied through the movement of the movable surfaces, in order to allow access to a limited zone of a tray below.

The currently available solutions have several drawbacks.

In general, they are particularly complex and delicate solutions. In the case of independent doors, it is in fact necessary to provide a movement means for each door. Furthermore, the arrangement and the structure of the doors, once established, do not allow the dimension and position of the articles on their tray to be changed. In the case of movable surfaces, it is instead necessary to provide complex systems for moving the surfaces themselves. Furthermore, the movable surfaces may not be sufficiently resistant to impacts and jams, due for example to the incorrect positioning of the articles, or to accidental falls of the articles.

The aim of the present invention is to offer a device for selectively picking up and depositing articles to an automatic warehouse that makes it possible to overcome the drawbacks of the currently available devices.

An advantage of the device according to the present invention is that of guaranteeing high flexibility in relation to the shape, dimension and position of the articles to be processed.

Another advantage of the device according to the present invention is that of being substantially simpler than the currently available devices.

Another advantage of the device according to the present invention is that it can be easily adapted to already operating automatic warehouses.

Further characteristics and advantages of the present invention will become more apparent in the following detailed description of an embodiment of the present invention, illustrated by way of non-limiting example in the attached figures, in which.

Figure 10:
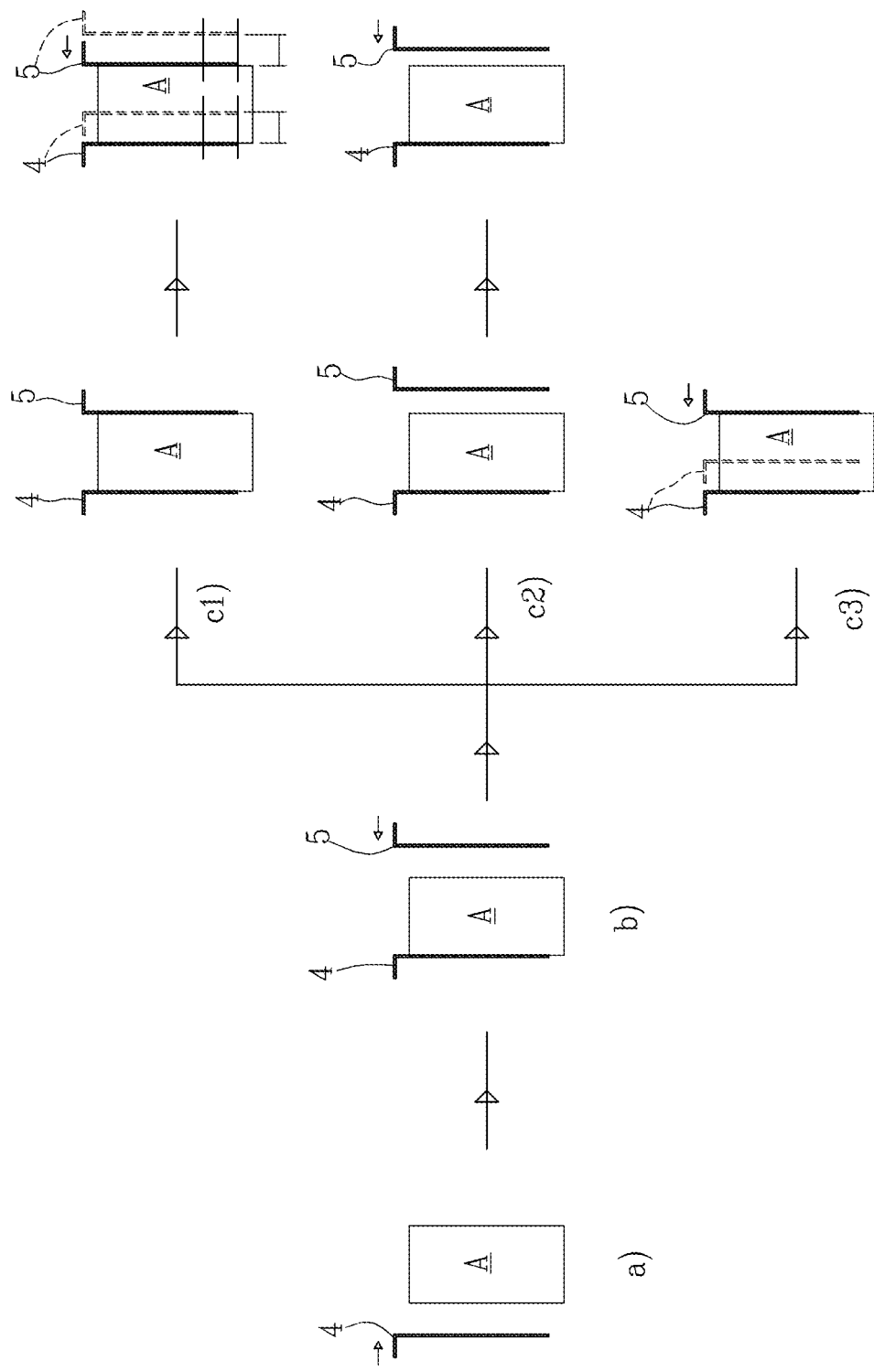

FIG. 10 schematically shows some steps of picking up an article.

Figure 1:
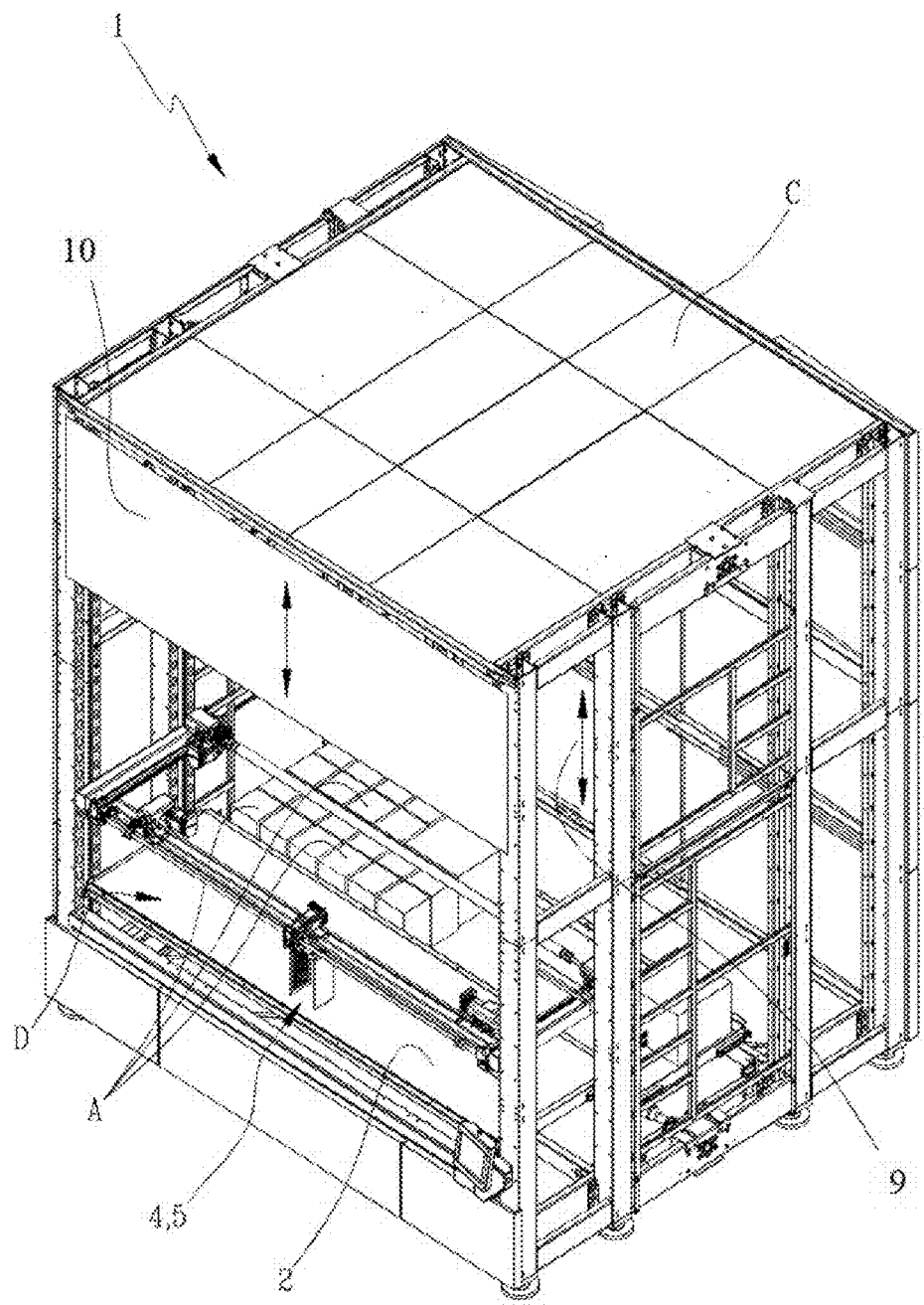
FIG. 1 illustrates a schematic view of an automatic warehouse equipped with the selective picking up and depositing device according to the present invention.

The automatic warehouse (1), shown schematically in FIG. 1, comprises an internal space, delimited overall by an outer casing (C) supported by a load-bearing frame. The outer casing (C) has been removed from the lateral zones of the warehouse (1) to show the inside, while it has been maintained on the upper zone of the warehouse (1). Within the warehouse, one or more support structures are arranged, not illustrated in detail as they are known to a person skilled in the art, configured to define a plurality of stopping positions, each of which can support a container, e.g. a tray (V), which is in turn intended to contain a plurality of articles (A). The support structures for the trays (V) may be, for example, in the form of shelves.

The inside of the warehouse is accessible through a main opening (D). A movement unit, not shown in detail since it is known in the sector, makes the trays (V) move between their relative positions on the support structures, and a temporary stopping station, which will be better described below, at which the articles (A) can be picked up or deposited onto the tray (V).

In a particularly effective embodiment, the automatic warehouse comprises a control module, e.g. a processor, which contains the data relating to both the position of each article (A) with respect to the support structures, and the position of each article (A) on its own tray (V). In particular, the control module attributes a precise position to each article (A) which must be introduced into the warehouse, both in relation to the destination tray (V), and in relation to the destination support structure of the tray (V). When each article (A) must be picked up from the warehouse, the control module is then able to identify the precise position of the article itself, and therefore to activate the movement unit that picks up the corresponding tray (V) and deposits it at the temporary stopping station. In the same way, when an article (A) must be arranged within the warehouse, the control module is able to identify the tray onto which the article must be deposited, and the position in which to arrange the article on the tray.

The control module may be equipped with an interface, e.g. a touch-screen display, through which it is possible to indicate to the control module itself a particular article (A) to be picked up or deposited in the warehouse. Such interface may be combined with a code reader, for example bar codes or QR codes, useful for simplifying the identification of the articles, especially at the time of depositing in the warehouse.

In general, the structure of the control algorithm with which the warehouse control module is equipped is known to a person skilled in the art, therefore it will not be described in further detail.

The automatic warehouse may be provided with a device for selectively picking up and depositing articles according to the present invention. Such device for selectively picking up and depositing articles comprises a support plane (2) for the temporary support of an article (A). For example, the support plane (2) may be located in the vicinity of the main opening (D) of the warehouse, immediately inside it. The support plane (2) is intended to support an article (A)

coming from the outside of the warehouse, e.g. coming from an operator, or to support an article (A) coming from the inside of the warehouse, so that the article (A) can be picked up by an operator.

The device for selectively picking up and depositing according to the invention further comprises a temporary support (3), configured for the temporary support of a tray (V). The temporary support (3) substantially defines the temporary stopping station, briefly mentioned in the initial part of the description. The trays (V) are transferred to and from the temporary support (3) by means of the movement unit (not illustrated in detail) already mentioned above, which is also responsible for picking up and depositing the trays (V) on the support structures inside the warehouse.

The temporary support (3) comprises for example a structure that defines a support plane for a tray (V). Preferably, the temporary support (3) is placed next to the support plane (2), so that the support plane (2) is interposed between the main opening (D) and the temporary support (3).

The device according to the present invention also comprises a manipulator (4,5), which is so structured as to grasp and release an article (A) and to translate the article (A) between the support plane (2) and the temporary support (3).

The manipulator (4,5) and the temporary support (3) are movable relative to one another along a vertical direction, between a position of maximum distance and a position of minimum distance. In the position of minimum distance, the manipulator (4,5) can pick up or release an article (A) on the temporary support (3), or on the tray (V) supported by the temporary support (3). In the position of maximum distance, the manipulator (4,5) can translate on a horizontal plane without interfering with the other articles (A) lying on the temporary support (3).

The relative movement between the manipulator (4,5) and the temporary support (3) may be obtained either by making both devices vertically movable or by making just one of them movable. For example, the temporary support (3) may be fixed with respect to the vertical direction, while the manipulator (4,5) may be vertically movable.

In the solution represented in the figures, the manipulator (4,5) is movable on a horizontal plane. The temporary support (3) is vertically movable between an upper position (FIG. 6), wherein the manipulator (4,5) is able to pick up or release an article (A), and a lower position (FIGS. 2,3,4,5, 7,8), located below the upper position. The height of the lower position is such as to allow the translation of the manipulator (4,5) on a horizontal plane, without any interference with the other articles (A) lying on the temporary support (3), or on the tray (V) supported by the temporary support (3). In particular, the height difference between the upper position and the lower position of the temporary support (3) is greater than the maximum height of the articles (A) placed on the temporary support (3). Advantageously, the temporary support (3) may be defined by the movement unit inside the warehouse, already mentioned above, which makes the trays (V) move between the relative positions on the support structures and the position illustrated in the figures, wherein the trays (V) are reachable by the manipulator (4,5).

The device according to the present invention comprises a control module that governs and controls the operation of the temporary support (3) and of the manipulator (4,5). The control module, which is preferably the same one that governs the functions of the automatic warehouse, is provided with a control algorithm which operates in the following way.

In general, the control module operates at least a cycle for depositing an article (A) inside the warehouse (1) and at least a cycle for picking up an article inside the warehouse (1). The two cycles may also be performed in succession, in any sequence. In an initial non-operating condition, the manipulator (4,5) is in an initial position, for example, located at the edge of the support plane (2).

Figure 3:
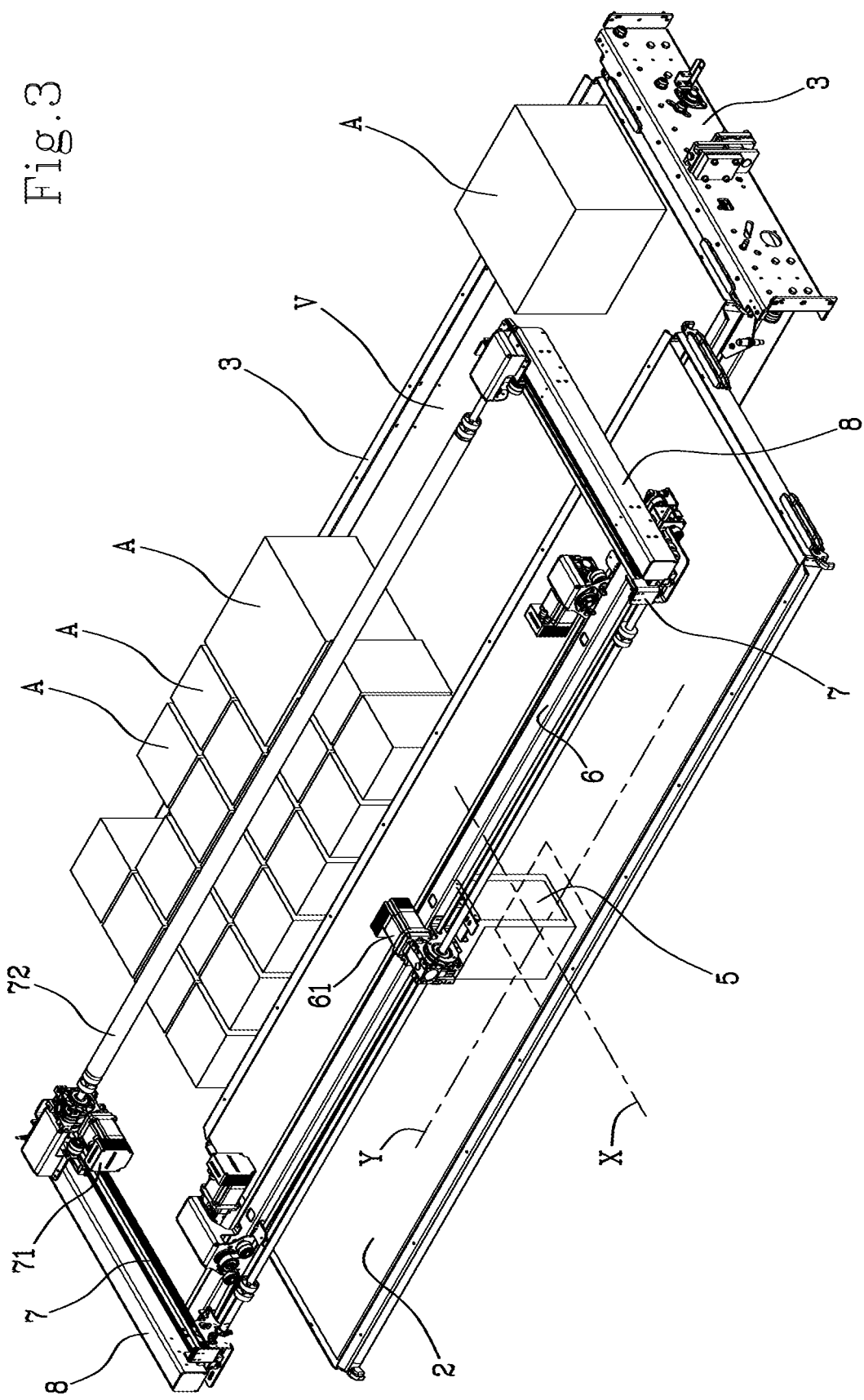
Figure 4:
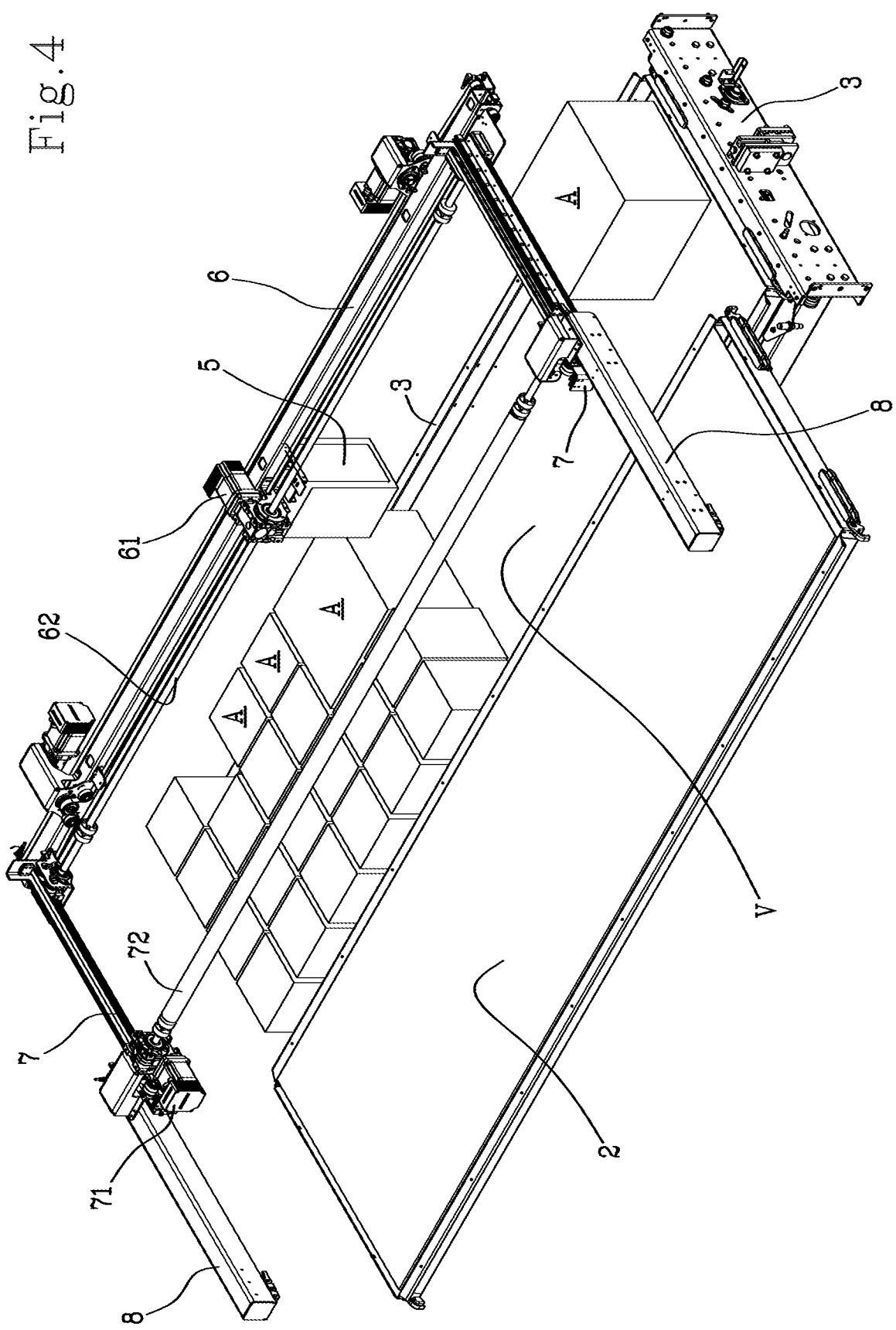
Figure 5:
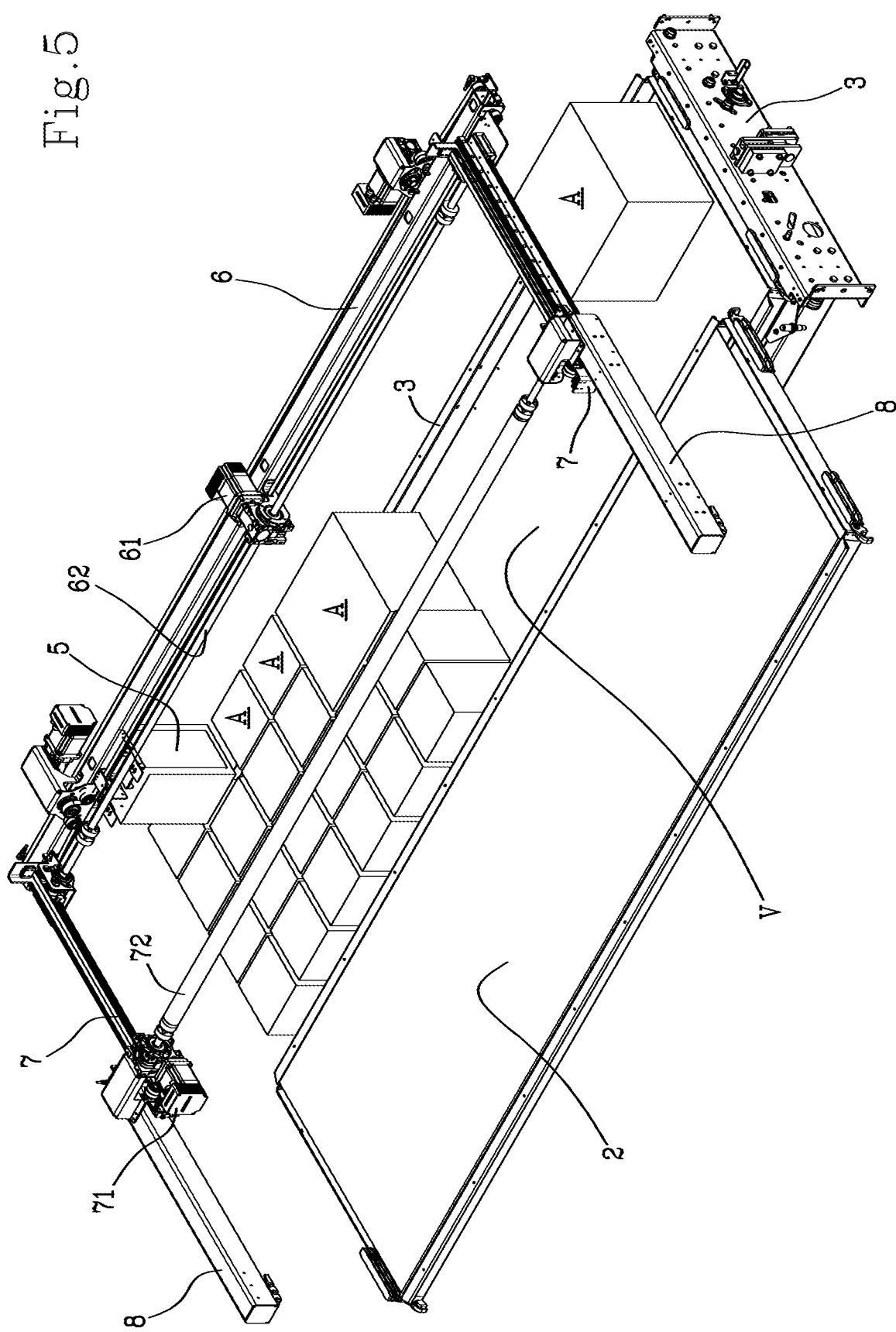
Figure 6:
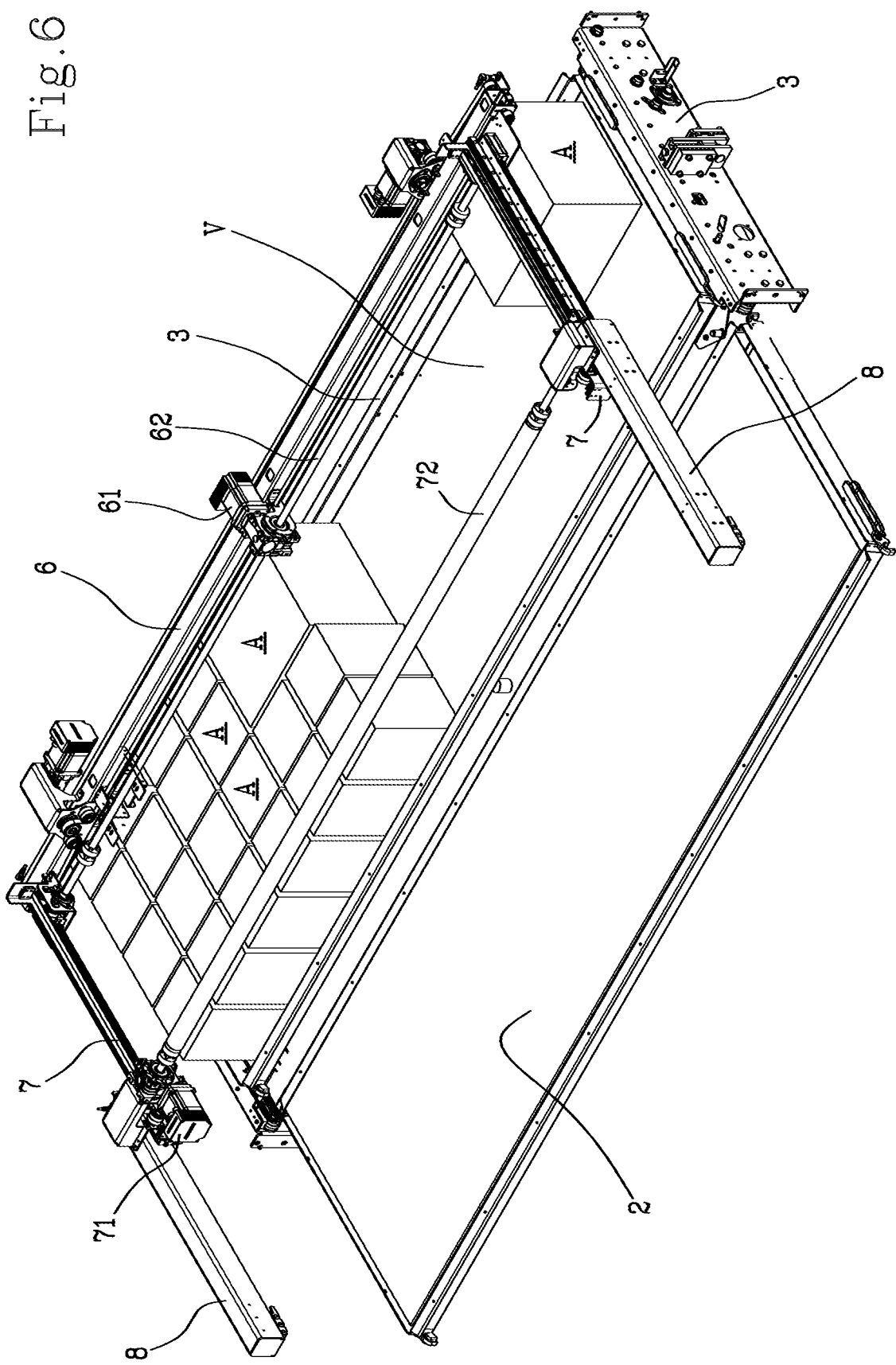
Figure 7:
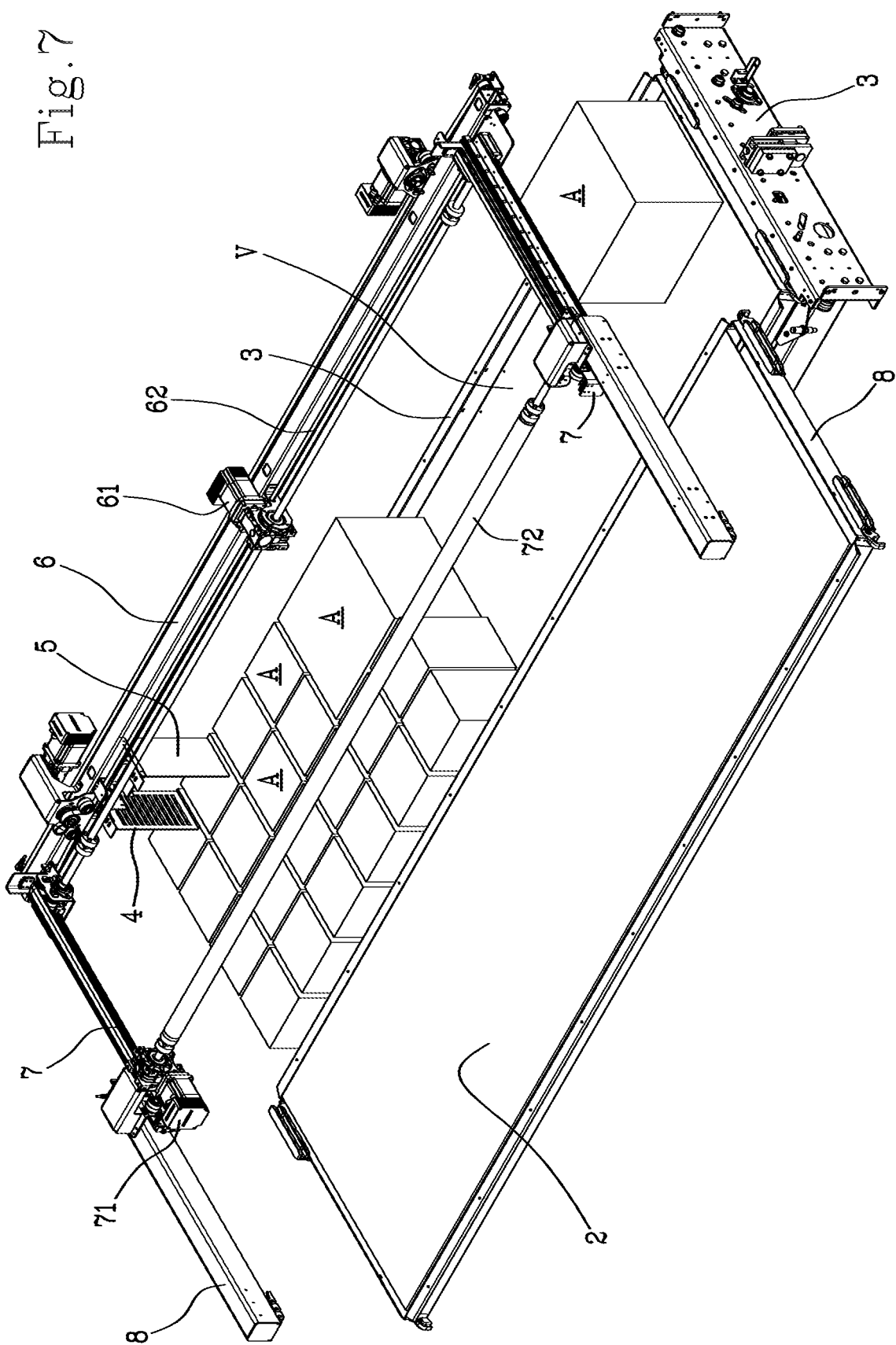
Figure 8:
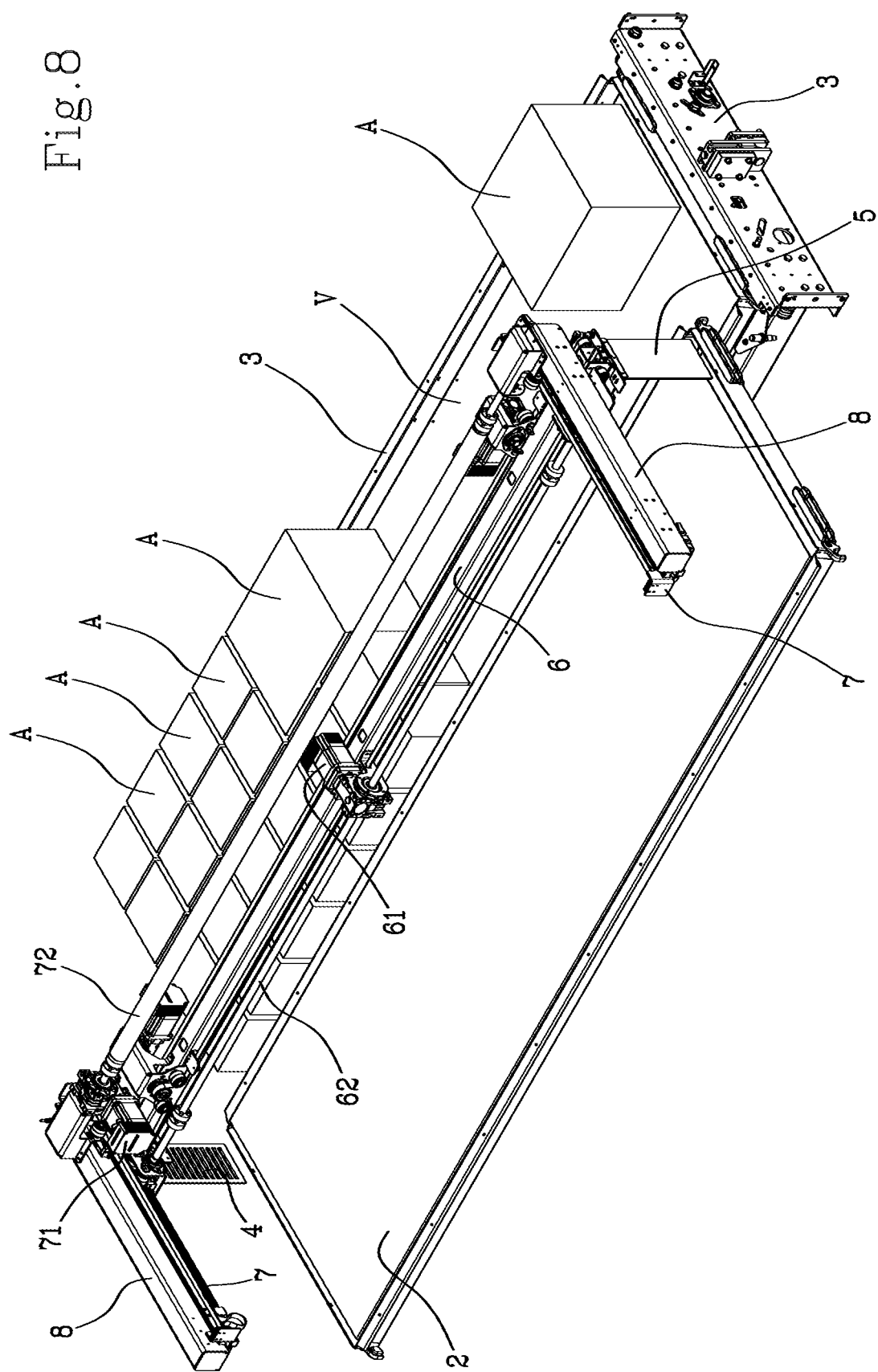

The depositing cycle envisages picking up an article (A) positioned on the support plane (2), and the subsequent transfer of the article (A) onto a tray (V) previously positioned on the temporary support (3). In such depositing cycle, the manipulator (4,5) is activated to grasp the article (A) positioned on the support plane (2) (FIG. 3). After grasping it, the manipulator (4,5) transfers the article (A) into a predetermined position above the temporary support (3) (FIG. 5). To allow the positioning of the article (A), the temporary support (3) is brought and maintained in its own lower position. This allows the translation of the manipulator (4,5), and of the article (A) associated therewith, above the temporary support (3). The temporary support (3) is then moved into the upper position and the article (A) is released onto the temporary support (3) (FIG. 6). Following the release of the article (A), the temporary support (3) is moved into the lower position, so that the manipulator (4,5) can return to its own initial position (FIGS. 7,8).

The predetermined position above the temporary support (3), into which the manipulator (4,5) brings the article (A), is established by the control module, by means of its own control algorithm. In other words, subject to the recognition of the article (A), the control module can choose both the tray (V) and the position in which the article (A) is to be arranged on the tray (V) itself.

A second control cycle is a cycle for picking up an article (A) from the warehouse (1). Such pickup cycle provides for picking up an article (A), contained in a tray (V) previously arranged on the temporary support (3), and depositing the article on the support plane (2). The article (A) to be picked up can be communicated to the control module through the interface already mentioned. It is also to be remembered that the control module (2) has in its memory the position of each article (A) inside the warehouse (1). After receiving the indication of the article to be picked up, the control module picks up the corresponding tray (V) and transfers it to the temporary support (3), by means of the movement unit. The temporary support (3) is also moved and/or maintained in its own lower position. The manipulator (4,5) is then translated above the article (A) to be picked up. When the manipulator is in the desired position, the temporary support (3) is moved into its upper position, in which the manipulator (4,5) grasps the article (A). Subsequently, the temporary support (3) is moved into its own lower position, so that the manipulator (4,5) can translate to bring the article (A) onto the support plane (2). The sequence of the steps of the pickup cycle can be easily deduced from the figures shown, starting from the initial position of FIG. 2. The manipulator (4,5) is brought into the position of FIG. 7, obviously empty, and picks up the article, subject to the lifting of the temporary support (3) (FIG. 6). After picking up the desired article, the temporary support (3) is lowered (FIG. 5) and the manipulator (4,5) brings the selected article onto the support plane (2) (FIG. 3).

As already mentioned, the two pickup and deposit cycles can be concatenated with one another so that after depositing an article (A) on the temporary support (3), the manipulator (4,5) picks up another one before returning towards the support plane (2).

The vertical translation of the temporary support (3) between its own lower and upper positions allows the structure of the manipulator (4,5) to be notably simplified, which can therefore be limited to movements on a horizontal plane.

In the embodiment represented, the manipulator (4,5) is movable along a front direction (X) and along a transverse direction (Y) perpendicular one to another. The front direction (X) substantially extends in a perpendicular direction to the main opening plane (D). The transverse direction (Y) is perpendicular to the front direction (X) and lies on a horizontal plane. Such two directions (X,Y) also define a system of coordinates based on which the control module can define the position of each article (A) on a horizontal plane, and can therefore define the position of each article (A) on a tray (V) positioned on the temporary support (3).

Advantageously, the manipulator (4,5) comprises a first pickup element (4) and a second pickup element (5), movable independently of each other along the transverse direction (Y). Each pickup element (4,5) is slidingly actuated by its own actuator, controllable independently from the activation actuator of the other pickup element.

Picking up an article (A), either on the support plane (2), or on a tray (V) located on the temporary support (3), envisages moving the first and the second pickup element (4,5) towards each other from opposite sides of the article (A), to exert pressure on the surface of the article (A) that allows a firm grasp thereof. In particular, the articles (A) have at least two opposing gripping surfaces (G). In the example shown, wherein the articles (A) are rectangular prism shaped, the gripping surfaces (G) are parallel and perpendicular to the transverse direction (Y). In articles (A) of different shapes, the gripping surfaces could be arranged and conformed differently. Each pickup element (4,5) is brought into contact with a respective gripping surface of the article (A). The two pickup elements (4,5) are then brought towards one another so as to grip the article (A) between them.

The independent movement of each pickup element (4,5) allows articles (A) of any width to be grasped, meaning the dimension measured parallel to the transverse direction (Y). The only limit to the width that can be grasped by the pickup elements (4,5) is substantially represented by the maximum mutual distance at which the pickup elements (4,5) themselves can be positioned. Furthermore, the independent movement of the pickup elements (4,5) allows, for each pickup element, the same actuator to be used for gripping an article (A) and for performing the positioning along the transverse direction (Y). With respect to known solutions, which envisage the use of a manipulator in a single unit, for example in the form of a gripper, the manipulator (4,5) according to the present invention allows greater flexibility of use to be obtained, since it allows articles of a variable width to be gripped, and the use of a specific actuator for controlling the grip to be avoided. A further advantage due to the independent activation of the pickup elements (4,5) is provided by the possibility to place each pickup element (4,5) at the edge of the support surface (2), e.g. in the position of FIG. 2, so as to make the support surface (2) completely accessible and usable.

The actuators (41,51) for the independent sliding of the pickup elements (4,5) along the transverse direction (Y) are only schematically represented, since they are devices known to a person skilled in the art. For example, the actuators (41,51) may comprise electric step motors, equipped with encoders, and may be connected to the respective pickup element through a toothed belt.

Preferably, to simplify the control of the pickup elements (4,5), a deposit zone (R) can be defined for the articles (A), located on the support plane (2). In particular, the pickup elements (4,5) deposit the article (A) on such deposit zone, at the end of the pickup cycle. Furthermore, the article (A) to be deposited inside the warehouse (1) is located on the deposit zone at the start of the deposit cycle. If the deposit zone (R) is used, the control module may direct the pickup elements (4,5) towards the coordinates of the deposit zone itself, which may remain fixed, without any need to communicate new coordinates at each operating cycle.

To simplify the control of the pickup elements (4,5) and the definition of the mutual distance at which they must be located for picking up an article, the control module has in its memory the information related to the distance between the two opposing gripping surfaces for each article (A). In this way, once they have been centred with respect to the article (A) to be picked up, the pickup elements (4,5) are moved towards one another up to a distance that depends on the distance between the gripping surfaces (G) of the article (A). Pressure sensors, connected to the control module, may be combined with the two pickup elements (4,5) for detecting the pressure exerted on the article (A), so as to allow the correct positioning of the pickup elements (4,5) themselves.

The independent mobility of the pickup elements (4,5) further allows an effective measurement method of at least one main dimension of the articles (A), in particular of the distance that separates the gripping surfaces (G). Such measurement method is schematically indicated in FIG. 10, and takes place in the following ways. It is to be noted that, as already specified, the control module, e.g. through the encoder, is able to detect and measure the movements performed by both the pickup elements (4,5). The control module further has in its memory the main dimension envisaged for each article (A).

For picking up an article, the control module commands the first pickup element (4) to move towards the article (A), based on the envisaged dimension for the article (A) (step schematically indicated with "a" in FIG. 10). Subsequently, the control module commands the second pickup element (5) to move towards the article (A), based on the envisaged dimension for the article (A) (step "b").

If the article (A) has a larger main dimension than envisaged, the second pickup element (5) enters into contact with the article (A) while moving towards the first pickup element (4) and at a longer distance from the latter than envisaged (step "c3"). The thrust exerted by the second pickup element (5) on the article (A) further causes a movement of the first pickup element (4). Such movement of the first pickup element (4) therefore occurs sooner than envisaged, i.e. before the second pickup element (5) has reached the position envisaged by the control module for picking up the article (A). The advance movement of the first pickup element (4) can therefore be interpreted by the control module as a signal of the presence of an article (A) whose main dimension is larger than that envisaged.

If instead the article (A) has a main dimension corresponding to the envisaged one, the movement of the second pickup element (5) towards the article (A) is substantially concluded in contact with the article (A) itself (step "c1"). In that case, the subsequent movement of the second pickup element (5) towards the first pickup element (4) produces, on the article (A), a thrust that causes an equal movement of the first pickup element (4) to the movement performed by the second pickup element (5). Therefore, the detection of equal movements for the first and the second pickup element can be used by the control module as a signal of the presence of an article (A) whose main dimension corresponds to the envisaged one.

If the article (A) has a smaller main dimension than the envisaged one, the movement of the second pickup element (5) towards the article (A) is concluded at a certain distance from the article (A) itself (step "c2"). In that case, the subsequent movement of the second pickup element (5) towards the first pickup element (4) firstly leads to the contact of the second pickup element (5) with the article (A), and subsequently to the thrust that causes the movement of the first pickup element (4). In this case, however, the movement of the first pickup element (4) is smaller than that performed by the second pickup element (5). Therefore, the detection of a smaller movement of the first pickup element (4) with respect to that performed by the second pickup element (5) can be used by the control module as a signal of the presence of an article (A) whose main dimension is smaller than the envisaged one.

Preferably, the articles (A) are arranged on respective trays (V) separated by spaces sufficiently wide to allow the insertion of the pickup elements (4,5), during the relative vertical movement between the pickup elements themselves and the temporary support (3). In substance, between each article and the two adjacent articles two corridors must be maintained that allow the insertion of the two pickup elements (4,5), as shown in FIG. 6. In general terms, the data related to the position of each article on its tray (V) are then processed and memorised by the control module, considering the dimensions of the article, at least along the front and transverse directions (X,Y), and the necessary spaces for the insertion of the pickup elements (4,5) between contiguous articles (A).

Figure 9:
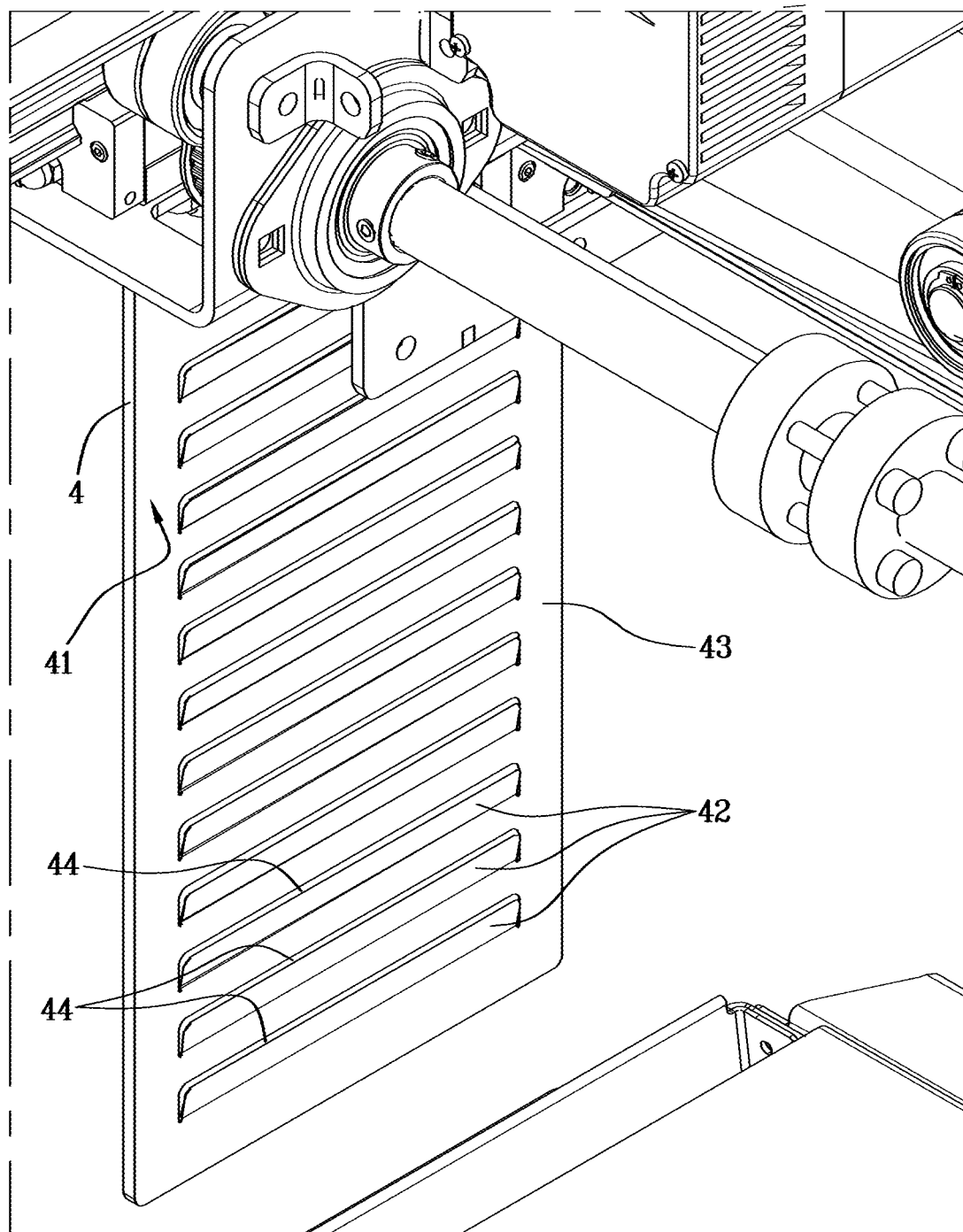
FIG. 9 shows an enlargement of an operating surface of a pickup element.

To improve the grip of the articles (A), each pickup element has an operating surface (41,51), intended to come into contact with the article (A) to be picked up. FIG. 9 shows an enlargement of the operating surface (41) of the first pickup element (4). The operating surface (51) of the second pickup element (5), which remains hidden in the figures, is to be considered substantially equal to the operating surface of the first pickup element (4). The operating surface (41) of the pickup element (4) comprises a plurality of elastic reliefs (42). Such elastic reliefs are cut out on a flexible plate (43), associated with the operating surface (41). In particular, the elastic reliefs (42) are substantially rectangular shaped and are cut out from the flexible plate (43) along three consecutive sides, while they are integral with the flexible plate (43) at a lower side. In this way, the elastic reliefs have a free upper edge (44) facing upwards, which is firmly opposed to the slipping downwards of the article (A). The elasticity of the elastic reliefs (42) further prevents the exercise of excessive pressure on the surface of the article (A), since each relief (42) is free to be deformed upon exceeding a certain pressure. To further improve the grip, an elastomeric layer, not illustrated in the figure, may be interposed between the flexible plate (43) and the pickup element (4).

In the embodiment shown, the manipulator (4,5) is slidingly associated with a cross member (6) parallel to the transverse direction (Y). In particular, each pickup element (4,5) is slidable along such cross member (6) parallel to the transverse direction (Y). For example, each pickup element (4,5) is arranged below the cross member (6) and is associated therewith by means of a prismatic guide. The position of the pickup elements (4,5), below the cross member (6), notably increases the maximum length of the articles (A), considered as the parallel dimension to the front direction (X), which can be picked up by the manipulator (4,5). Preferably, the actuators (41,51) of the pickup elements (4,5) are also associated with the cross member (6).

The cross member (6), in turn, is movable along the front direction (X). For that purpose, the device according to the present invention comprises a first guide (7), along which the cross member (6) is movable in the front direction (X). An actuator (61) is provided for producing the sliding of the cross member (6). In a possible embodiment, the actuator (61) comprises an electric motor that sets in rotation a motor shaft (62), parallel to the cross member (6). At its own ends, the motor shaft meshes with a shaped profile, integral with the first guide (7). In this way, the rotation of the motor shaft (62) produces the sliding of the cross member (6) along the first guide (7).

The first guide (7) is associated with a second guide (8), along which the first guide (7) is movable along the front direction (X). An actuator (71) is provided for producing the sliding of the first guide (7). In a possible embodiment, the actuator (71) comprises an electric motor that sets in rotation a motor shaft (72), integral with the first guide (7). At its own ends, the motor shaft (72) meshes with a shaped profile, integral with the second guide (8). In this way, the rotation of the motor shaft (72) produces the sliding of the first guide (7) along the second guide (8).

The second guide (8) may be arranged within the plan dimensions of the support plane (2), above the latter. The first guide (7) may assume an initial position in which, in turn, it is arranged within the dimensions of the second guide (8) along the front direction (X). When the first guide (7) is in such initial position, the zone of the temporary support (3) is substantially free from all upper dimensions, so that the temporary support (3) can move freely along the vertical direction, and can receive the articles (A) from above.

Figure 2:
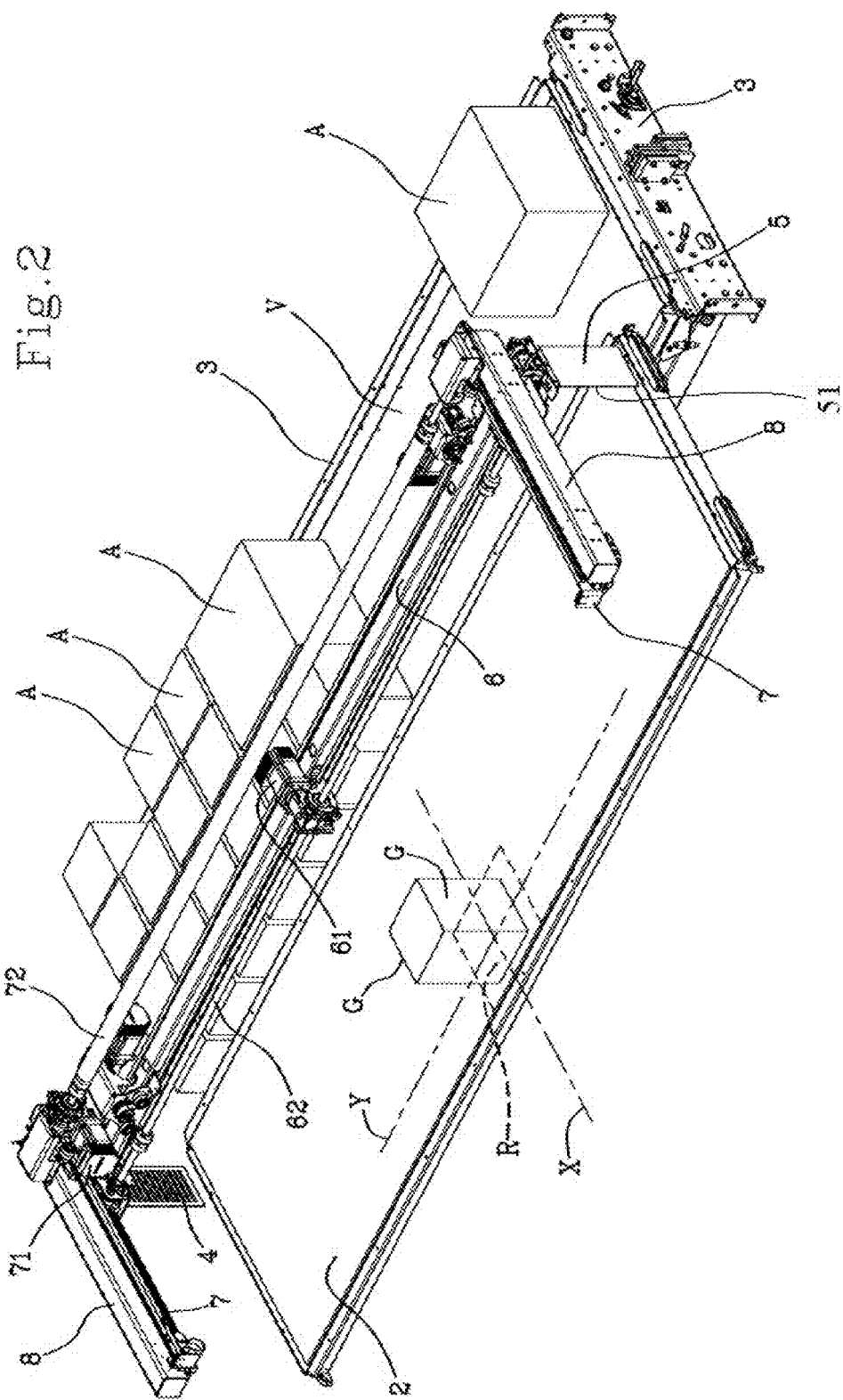
FIGS. 2 to 8 show in detail the selective picking up and depositing device, in a sequence of successive operations.

The configuration of the first and the second guide allows an initial or rest position of the pickup elements (4,5) to be defined, shown in FIG. 2, wherein the pickup elements (4,5) are on opposite sides of the support plane (2), in the vicinity of a rear edge of the support plane itself, i.e. in the vicinity of the edge of the support plane (2) facing the temporary support (3).

In this way, in the rest position of the pickup elements (4,5), the whole area of the support plane (2) remains clear, for facilitating the pickup or deposit of an article (A) by an operator.

The structure of the guides (7,8) allows two continuous and separable zones to be defined for the support plane (2) and for the temporary support (3). The zone of the support plane (2) is defined for example by the space above the support plane (2), inside the plan of the support plane (2) itself. The zone of the temporary support (3) is defined, in turn, by the space above the temporary support (3), inside the plan of the temporary support (3) itself.

Advantageously, a first movable barrier (9) may be provided for separating, along the front direction (X), the temporary support (3) from the support plane (2). Such movable barrier (9) may assume an open configuration, in which it allows the passage of the manipulator (4,5) from the temporary support (3) to the support plane (2) and vice versa, and a closed configuration, in which it separates the temporary support (3) and the support plane (2), impeding access between the two. In substance, when the movable barrier (9) is in the closed configuration, it is not possible to access the temporary support (3) and the inside of the warehouse (1) through the main opening (D).

A second movable barrier (10) may be provided for separating, along the front direction (X), the support plane (2) from the space external to the device. Such second movable barrier (10) may be used, for example, to close and open the main opening (D). For that purpose, the second movable barrier (10) may assume an open configuration, in which it allows access to the support plane (2), and a closed configuration, in which it impedes access to the support plane (2), in particular through the main opening (D).

The two movable barriers (9,10) may be activated by the control module so as to allow an article (A) to be picked up or deposited on the support plane (2), without allowing access to the temporary support (3) and to the inside of the warehouse (1). For that purpose, the control module activates the first movable barrier (9) in its open configuration only if the second movable barrier (10) is in its closed configuration, and vice versa.

In the case of the pickup cycle of an article (A) from the warehouse (1), the second barrier (10) is initially closed, while the first barrier (9) may be brought into the open configuration. Under such conditions, the manipulator (4,5) picks up, from the temporary support (3), the selected article and deposits it on the support plane (2). At this point, the first barrier (9) may be brought into the closed configuration and, subsequently, the second barrier (10) may be brought into the open configuration. An operator can then access the support plane (2) for picking up the article, finding the first barrier (9) closed, which impedes access to the temporary support (3) and to the inside of the warehouse (1).

In the case of the deposit cycle of an article (A) inside the warehouse (1), the second barrier (10) is in the open configuration, while the first barrier (9) is in the closed configuration. The article (A) can then be deposited on the support plane (2), without the possibility of accessing the temporary support (3). Subsequently the second barrier (10) closes. At this point, the manipulator (4,5) picks up the article (A) from the support plane (2) and the first barrier (9) opens, to allow the passage of the manipulator (5) from the support plane (2) to the temporary support (3).

The invention claimed is:

1. A device for selectively picking up and depositing articles, destined to an automatic warehouse comprising: a support plane (2) for temporary supporting an article (A); a temporary support (3) configured to temporarily support a tray (V) suitable to contain a pre-determined number of articles (A); a manipulator (4,5) structured to grasp and release an article (A), and to translate the article (A) between the support plane (2) and the temporary support (3); the manipulator (4,5) comprising a first gripping element (4) and a second gripping element (5), wherein the first gripping element (4) and the second gripping element are movable independently of each other along a transverse direction (Y); the device for selectively picking up and depositing articles further comprising:
a control module that regulates and controls the operation of the manipulator (4, 5) for picking up an article (A) provided with two opposing gripping surfaces (G), in which the control module uses an algorithm executing the steps of:
moving the first gripping element (4) towards a first gripping surface (G) of the article (A), up to a pre-determined position;
operating the second pickup element (5) to perform a first approach stroke of a pre-determined length towards a second gripping surface (G) of the article (A);
operating the second pickup element (5) to perform a second approach stroke towards the first pickup element (4);

if, during the first approach stroke, the first pickup element (4) performs a shift due to the thrust exerted by the second pickup element (5) on the article (A), the presence of an article (A) is detected by the control module, wherein the distance that separates the gripping surfaces (G) is greater than a distance expected;
if, at the end of the second approach stroke by the second pickup element (5), the first pickup element (4) has performed, due to the thrust exerted by the second pickup element (5) on the article (A), a shift of length equal to the second approach stroke, the control module detects the presence of an article (A), wherein the distance that separates the gripping surfaces (G) corresponds to a distance expected;
if, at the end of the second approach stroke by the second pickup element (5), the first pickup element (4) has performed, due to the thrust exerted by the second pickup element (5) on the article (A), a shift of length lower than the second approach stroke, the control module detects the presence of an article (A), wherein the distance separating the gripping surfaces (G) is smaller than a distance expected.

2. The device for picking up and depositing articles according to claim 1, wherein the manipulator (4, 5) is movable on a horizontal plane.

3. The device for picking up and depositing articles according to claim 1, wherein the manipulator (4, 5) is movable along a front direction (X), wherein the front direction (X) is perpendicular to the transverse direction (Y).

4. The device for picking up and depositing articles according to claim 3, comprising a cross bar (6), movable along the front direction (X), wherein the first gripping element (4) and the second gripping element (5) are slidably associated to the cross bar (6).

5. The device for picking up and depositing articles according to claim 4, comprising a first guide (7), which is movable along the cross bar (6) in the front direction (X).

6. The device for picking up and depositing articles according to claim 1, comprising a second guide (8), wherein the first guide (7) is movable along the second guide (8) in the front direction (X).

7. The device for picking up and depositing articles according to claim 1, wherein:
the manipulator (4,5) and the temporary support (3) are movable relative to one another along a vertical direction, between a position of maximum distance and a position of minimum distance;
in the position of minimum distance, the manipulator (4,5) is capable of picking up an article (A) from or release an article (A) onto the temporary support (3), or onto the tray (V) which is supported by said temporary support (3);
in the position of maximum distance, the manipulator (4,5) can move on a horizontal plane without interfering with the other articles (A) lying on the temporary support (3).

8. The device according to claim 7, wherein: the temporary support (3) is vertically movable between an upper position, in which the manipulator (4, 5) can pick up or release an article (A), and a lower position, placed below the upper position; wherein a height of the lower position allows translation of an article (A) picked up by the manipulator on a horizontal plane without any interference with other articles (A) lying on the temporary support (3).

9. The device according to claim 8, wherein the height difference between the upper position and the lower position of the temporary support (3) is greater than the maximum height of the articles (A) on the temporary support (3).

10. The device according to claim 1, comprising a first movable barrier (9) that separates, along the front direction (X), the temporary support (3) and the support plane (2), wherein the movable barrier (9) can assume an open configuration, to allow a passage of the manipulator (4,5) from the temporary support (3) to the support plane (2) and vice versa, and a closed configuration, to prevent access between the temporary support (3) and the support plane (2).

11. The device according to claim 10, further comprising a second movable barrier (10) that separates, along the front direction (X), the support plane (2) from the outer space to the device; wherein the second movable barrier (10) can assume an open configuration to allow access to the support plane (2), and a closed configuration to prevent access to the support plane (2).

12. The device according to claim 11, further comprising a control module that regulates and controls the operation of the temporary support (3) and the manipulator (4, 5), wherein the control module uses an algorithm executing the steps of:
   for picking up an article (A) lying on the support plane (2), actuating the manipulator (4,5) to pick up the article and to subsequently transfer the article (A) in a desired position above the temporary support (3), the temporary support is initially in a lower position; when the article is in the desired position above the temporary support, moving the temporary support (3) to an upper position and releasing the article (A) thereon; and after that the article (A) is released onto the temporary support (3), moving the temporary support (3) to the lower position;
   for picking up an article (A) from the temporary support (3), while the temporary support (3) is in the lower position; moving the manipulator (4,5) above the article (A) to be picked up; moving the temporary support (3) to its upper position, and gripping the article with the manipulator (4,5); moving the temporary support (3) to the lower position; and after the temporary support is lowered, moving the article onto the support plane by the manipulator (4,5), and
   wherein the control module is further configured to operate the first movable barrier (9) in its open configuration only if the second movable barrier (10) is in its closed configuration, and vice versa.

13. The device according to claim 1, comprising a control module that regulates and controls the operation of the temporary support (3) and the manipulator (4, 5), which wherein the control module uses an algorithm executing the steps of:
   for picking up an article (A) lying on the support plane (2), actuating the manipulator (4,5) to pick up the article and to subsequently transfer the article (A) in a desired position above the temporary support (3), the temporary support is initially in a lower position; when the article is in the desired position above the temporary support, moving the temporary support to an upper position and releasing the article (A) thereon; and after that the article (A) is released onto the temporary support (3), moving the temporary support (3) to the lower position;
   for picking up an article (A) from the temporary support (3), while the temporary support (3) in the lower position; moving the manipulator (4,5) above the article (A) to be picked up; moving the temporary support (3) to its upper position, and gripping the article with the manipulator (4,5); moving the temporary support (3) to the lower position; and after the temporary support is lowered, moving the article onto the support plane by the manipulator (4,5).

14. An automatic warehouse, including:
   an outer casing (C);
   one or more support structures, configured to define a plurality of resting positions, each resting position is configured to support a tray (V), wherein the tray is configured to contain a plurality of articles (A);
   a main opening (D), through which it is possible to access the inside of the warehouse;
   a movement unit for causing the trays (V) to move between their relative positions on the support structures, and a temporary stopping station, wherein at the temporary stopping station, the articles (A) can be picked up or released onto the tray (A);
   a control module, for controlling the operation of the movement unit, contains in its comprising a memory for storing data related to both the position of each article (A) with respect to the support structures, and the position of each article (A) on its own tray (V);
   it wherein the automatic warehouse further comprises:
   a device for selectively picking up and depositing articles according to claim 1, wherein the temporary support (3) defines the temporary stopping station for the trays (V), and wherein the support plane (2) is proximal to the main opening (D).

15. An automatic warehouse, including:
   an outer casing (C);
   one or more support structures, configured to define a plurality of resting positions, each resting position is configured to support a tray (V), wherein the tray is configured to contain a plurality of articles (A);
   a main opening (D), through which it is possible to access the inside of the warehouse;
   a movement unit for causing the trays (V) to move between their relative positions on the support structures and a temporary stopping station, wherein at the temporary stopping station, the articles (A) can be picked up or released onto the tray (A);
   a control module, for controlling the operation of the movement unit, comprising a memory for storing data related to both the position of each article (A) with respect to the support structures, and the position of each article (A) on its own tray (V);
   wherein the automatic warehouse further comprises:
   a device for selectively picking up and depositing articles comprising:
      a support plane (2) for temporary supporting of an article (A);
      a temporary support (3) configured to temporarily support of a tray (V) suitable to contain a predetermined number of articles (A);
      a manipulator (4,5) structured to grasp and release an article (A), and to translate the article (A) between the support plane (2) and the temporary support (3); wherein the manipulator (4,5) comprises a first gripping element (4) and a second gripping element (5), wherein the first gripping element (4) and the second gripping element are movable independently of each other along a transverse direction (Y); and wherein the temporary support (3) defines the temporary stopping station for the trays (V), and wherein the support plane (2) is proximal to the main opening (D).

16. The automatic warehouse according to claim 15, wherein:

the manipulator (4,5) and the temporary support (3) of the device for picking up and depositing articles are movable relative to one another along a vertical direction, between a position of maximum distance and a position of minimum distance; wherein:

in the position of minimum distance, the manipulator (4,5) is capable of picking up an article (A) from or release an article (A) onto the temporary support (3), or onto the tray (V) which is supported by said temporary support (3);

in the position of maximum distance, the manipulator (4,5) can move on a horizontal plane without interfering with the other articles (A) lying on the temporary support (3).

17. The automatic warehouse according to claim 16, wherein: the temporary support (3) is vertically movable between an upper position, in which the manipulator (4, 5) can pick up or release an article (A), and a lower position, placed below the upper position;

wherein a height of the lower position allows translation of an article (A) picked up by the manipulator on a horizontal plane without any interference with other articles (A) lying on the temporary support (3).

18. A device for selectively picking up and depositing articles, destined to an automatic warehouse comprising:

a support plane (2) for temporary supporting an article (A);

a temporary support (3) configured to temporarily support a tray (V) suitable to contain a predetermined number of articles (A);

a manipulator (4,5) structured to grasp and release an article (A), and to translate the article (A) between the support plane (2) and the temporary support (3);

the manipulator (4,5) comprising:

a first gripping element (4) and a second gripping element (5), wherein the first gripping element (4) and the second gripping element are movable independently of each other along a transverse direction (Y), wherein the manipulator (4, 5) is movable along a front direction (X), wherein the front direction (X) is perpendicular to the transverse direction (Y);

a cross bar (6), movable along the front direction (X), wherein the first gripping element (4) and the second gripping element (5) are slidably associated to the cross bar (6); and a first guide (7), which is movable along the cross bar (6) in the front direction (X).

19. A device for selectively picking up and depositing articles, destined to an automatic warehouse comprising:

a support plane (2) for temporary supporting an article (A);

a temporary support (3) configured to temporarily support a tray (V) suitable to contain a predetermined number of articles (A);

a manipulator (4,5) structured to grasp and release an article (A), and to translate the article (A) between the support plane (2) and the temporary support (3); wherein the manipulator (4,5) comprises a first gripping element (4) and a second gripping element (5), wherein the first gripping element (4) and the second gripping element are movable independently of each other along a transverse direction (Y);

the device for selectively picking up and depositing articles further comprising:

a first movable barrier (9) that separates, along the front direction (X), the temporary support (3) and the support plane (2), wherein the movable barrier (9) can assume an open configuration, to allow a passage of the manipulator (4,5) from the temporary support (3) to the support plane (2) and vice versa, and a closed configuration to prevent access between the temporary support (3) and the support plane (2).

* * * * *

UNITED STATES PATENT AND TRADEMARK OFFICE
CERTIFICATE OF CORRECTION

PATENT NO. : 10,793,356 B2  
APPLICATION NO. : 16/084482  
DATED : October 6, 2020  
INVENTOR(S) : Franco Stefani Page 1 of 1

It is certified that error appears in the above-identified patent and that said Letters Patent is hereby corrected as shown below:

In the Claims

In Column 11, Line 29 (Line 14 of Claim 12), please change "and after that the article" to -- and after the article --

In Column 11, Line 47 (Line 3 of Claim 13), please change "manipulator (4, 5), which" to -- manipulator (4, 5), --

In Column 11, Line 62 (Line 18 of Claim 13), please change "temporary support (3) in the lower" to -- temporary support (3) is in the lower --

In Column 12, Line 18 (Line 15 of Claim 14), please change "movement unit, contains in its comprising" to -- movement unit, comprising --

In Column 12, Line 22 (Line 19 of Claim 14), please change "it wherein the automatic" to -- wherein the automatic --

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*